United States Patent [19]
Correll

[11] 4,162,714
[45] Jul. 31, 1979

[54] SAFETY INTERLOCK SYSTEM FOR FIRE TRUCK PUMP THROTTLE CONTROL

[76] Inventor: Richard R. Correll, 320 Escobar Rd., Portola Valley, Calif. 94025

[21] Appl. No.: 886,860

[22] Filed: Mar. 15, 1978

[51] Int. Cl.² .............................................. B60K 25/06
[52] U.S. Cl. ..................................... 180/53 R; 74/482; 74/483 K; 169/24; 180/77 R; 180/77 D; 180/271
[58] Field of Search ................. 180/53 B, 53 D, 53 R, 180/82 A, 77 R, 77 D; 169/24; 74/878, 872, 843, 844, 482, 483 K

[56] References Cited

U.S. PATENT DOCUMENTS

| | | | |
|---|---|---|---|
| 2,209,666 | 7/1940 | Sheppard | 169/24 |
| 2,656,732 | 10/1953 | Clough | 180/77 R |
| 2,661,935 | 12/1953 | Willald | 180/77 R |
| 2,701,023 | 2/1955 | Clough | 180/77 R |
| 2,900,915 | 8/1959 | Rowell | 417/15 |
| 3,507,347 | 4/1970 | Bennett | 180/53 R |
| 3,521,612 | 7/1970 | Santi et al. | 123/179 BG |
| 3,729,106 | 4/1973 | Barbieri | 214/83.3 |

*Primary Examiner*—Richard A. Bertsch
*Assistant Examiner*—Donn McGiehan
*Attorney, Agent, or Firm*—Townsend and Townsend

[57] ABSTRACT

A safety interlock system for a fire truck pump throttle control. The fire truck has a transfer box which is coupled through an automatic transmission to the engine. The transfer box is manually shiftable from a first mode in which it operatively connects the engine with the fire truck wheels, to a second mode in which it operatively connects the engine with the pump. The fire truck has a throttle control remote from the cab to vary the engine speed when the engine is driving the pump. The present invention provides a mechanism which senses the mode of the transfer box and locks the remote throttle control when the transfer box is in its first mode so that the engine speed is not inadvertently advanced from the position remote from the cab while the engine is coupled to the wheels of the truck.

17 Claims, 6 Drawing Figures

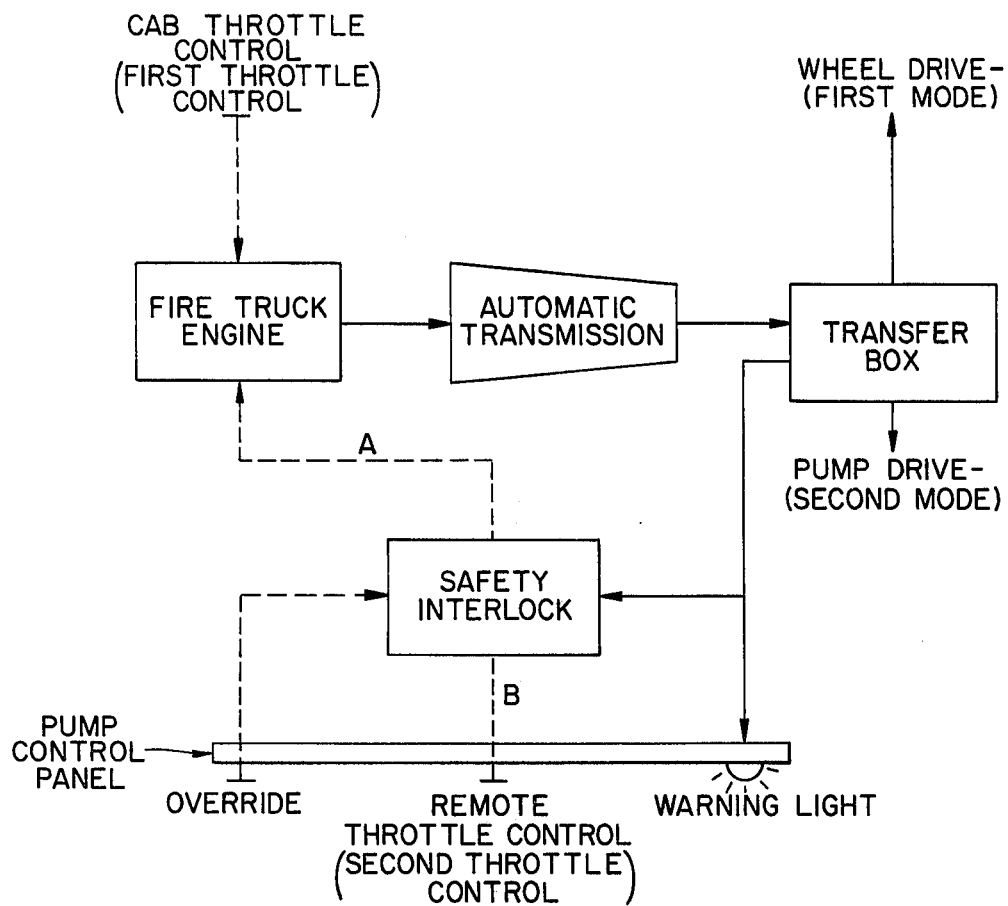
FIG._1.
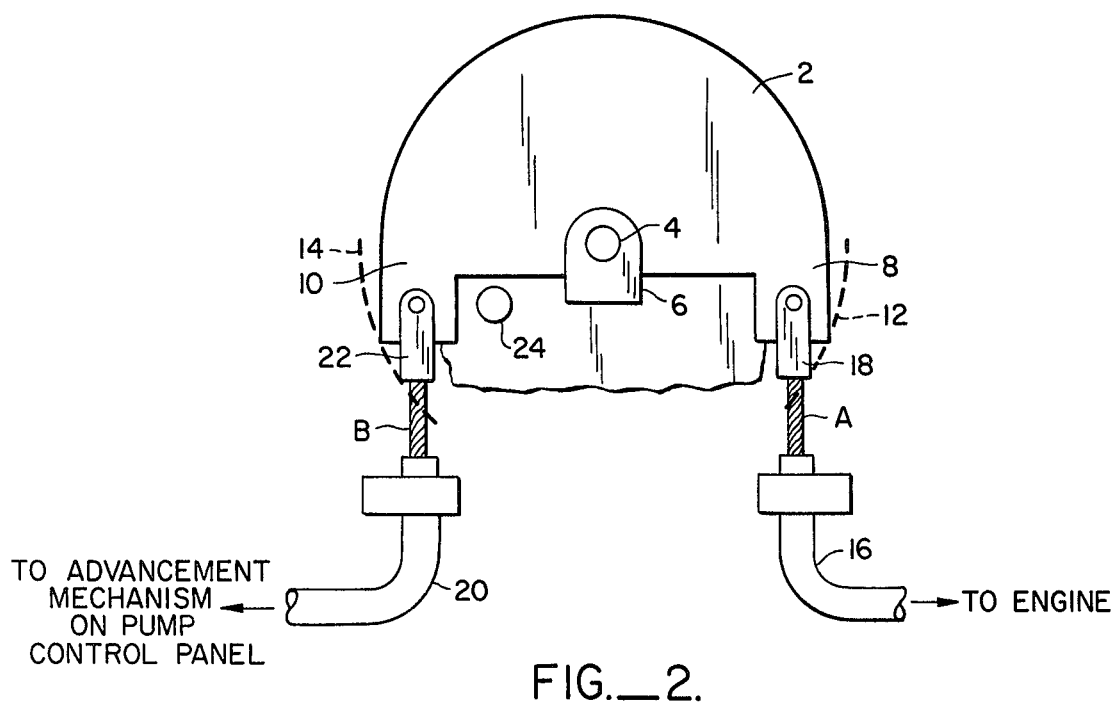
FIG._2.

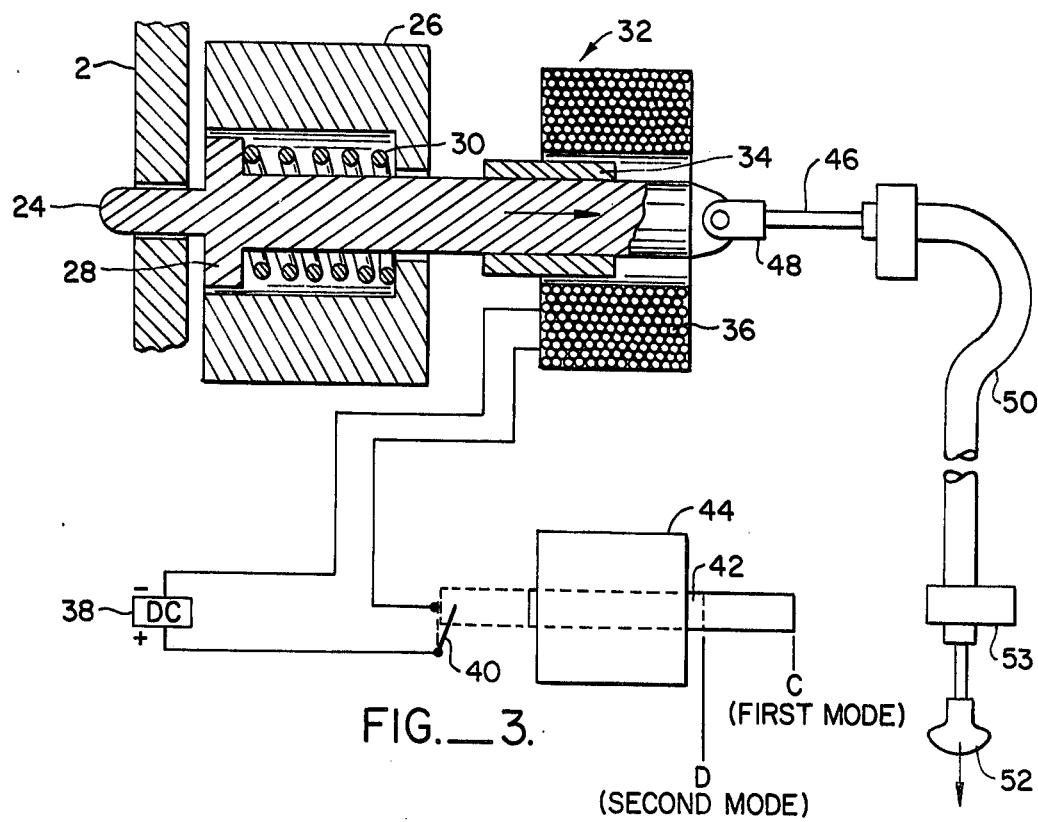
FIG._3.
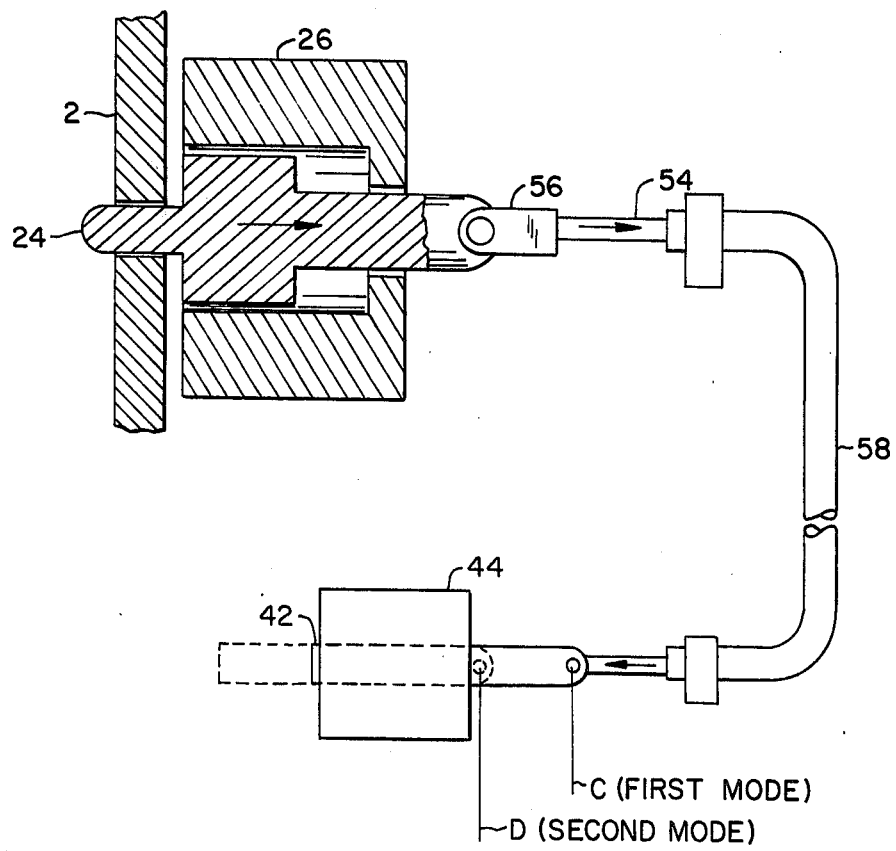
FIG._4.

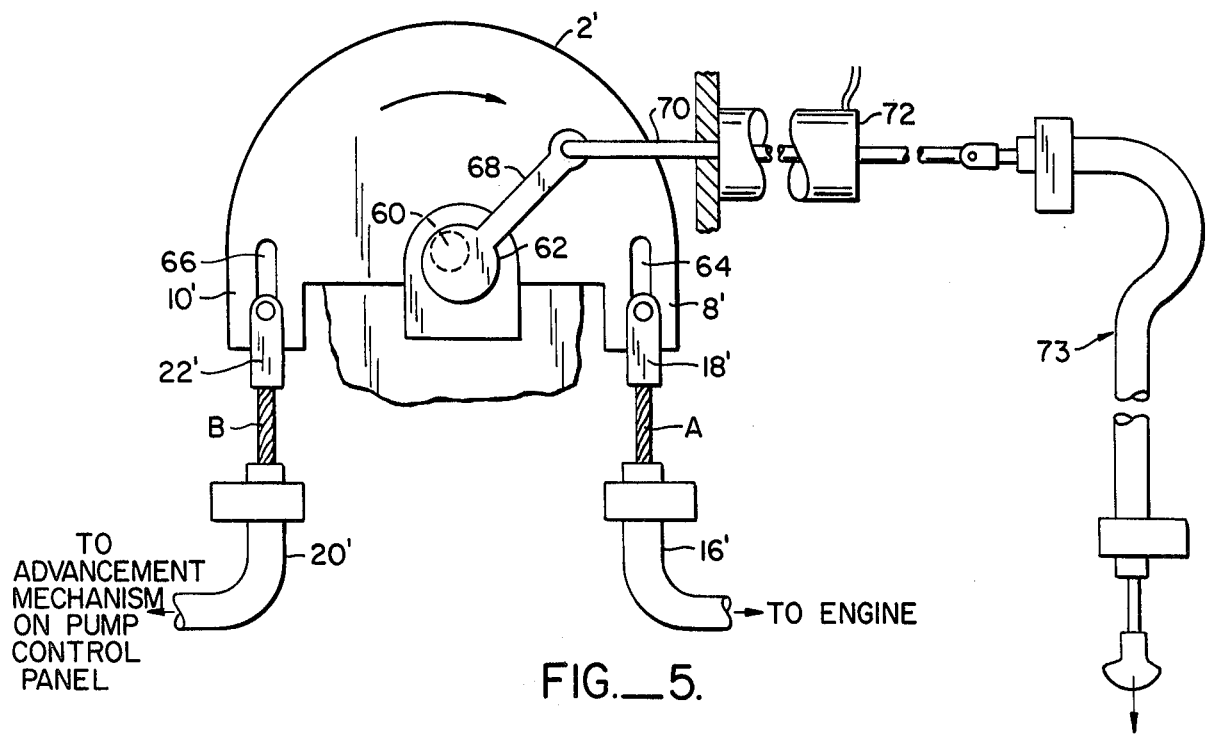
FIG._5.
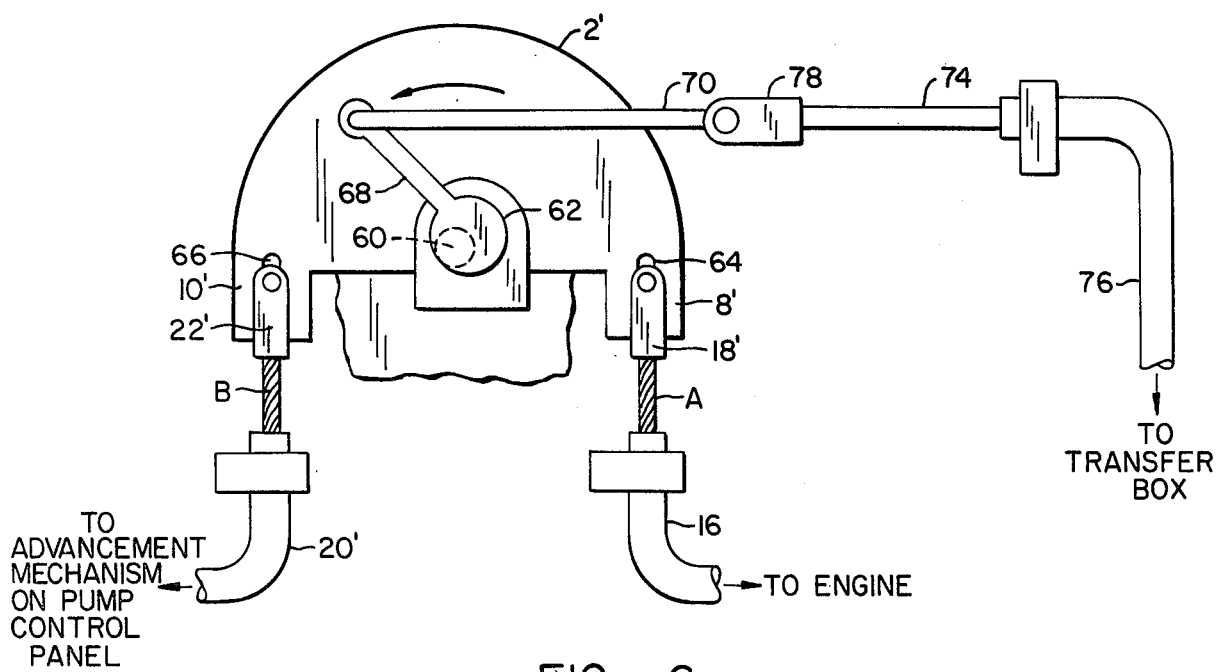
FIG._6.

SAFETY INTERLOCK SYSTEM FOR FIRE TRUCK PUMP THROTTLE CONTROL

BACKGROUND OF THE INVENTION

This invention relates to fire truck controls, and more particularly to safety apparatus for preventing the speed of the fire truck engine from being increased with its pump throttle control when the engine is operatively connected with the wheels of the fire truck.

In many fire trucks the same engine is used to either propel the fire truck or to drive a pump carried by the fire truck which dispenses water under high pressure to aid in the fighting of fires. Generally, such fire trucks have a transfer box which is coupled through a transmission to the engine. The transfer box is manually shiftable from a first mode in which it operatively connects the engine with the wheels, to a second mode in which it operatively connects the engine with the pump.

Such fire trucks typically have two throttle controls. When the fire truck is being driven, a first throttle control can be manually operated from the cab of the fire truck with an accelerator pedal. There is a large control panel on the side of the fire truck. The second throttle control includes a cable which is connected at one end to the engine and at its other end to an advancement mechanism on the control panel. When the fire truck is parked and the engine is driving the pump, the advancement mechanism can be manually operated to vary the engine speed to ensure proper water flow from the pump.

Early models of fire trucks had manual shift transmissions. When the fire truck arrived at the scene of a fire the driver brought the engine to idle speed and with the clutch pedal depressed the driver shifted the transfer box from its first mode to its second mode. The clutch was then released and firemen could vary the engine speed with the advancement mechanism at the side of the truck to ensure proper water flow from the pump. With such early models it was impossible for the driver to leave the cab with the engine running, the transmission in gear, and the transfer box in its first mode. the truck would lurch forward and stall the instant that the driver released the clutch. Therefore, varying the engine speed with the second throttle control never posed a problem in these early model fire trucks.

Later models of fire trucks use automatic transmissions and this presents a significant safety hazard. In such a later model fire truck it is possible for the driver to pull to a stop and leave the cab with the engine running and the automatic transmission in gear forgetting to shift the transfer box into its second mode (pump drive mode). The only thing that prevents the fire truck from moving at this point is the parking brake (if the driver remembered to set it) and the low engine idle speed. If a fireman increases the engine speed with the second throttle control (at the side of the truck) under these circumstances, with the intent of increasing the pump speed, and the increased engine power overcomes the parking brake, the fire truck will drive away with no one in the cab to control it.

Because of this danger, many later model trucks of this design have a red indicator light on the pump control panel to warn the fireman if the transfer box is still in its first mode. This light is activated by an electrical switch associated with the transfer box. While such a warning light helps to remind the fireman to shift the transfer box before advancing the second throttle control, it can be easily overlooked in the excitement and confusion which occurs at the scene of a fire. Thus, the use of such later model fire trucks involves the risk of a runaway fire truck. Therefore, a more reliable safety apparatus is required.

SUMMARY OF THE INVENTION

The present invention provides a mechanism which senses the mode of the transfer box and locks the pump throttle control when the transfer box is in its first mode so that the engine speed is not inadvertently advanced from a position remote from the cab while the engine is coupled to the wheels of the fire truck.

It is an object of the present invention to provide an effective safety interlock system for a fire truck pump throttle control. An advantage of the invention is that it is simple and inexpensive to construct. It can be readily added to fire trucks which are already in use. Another advantage of the invention is its reliability. Because of its simple design it is highly unlikely that it will fail and the risk of runaway fire trucks is substantially reduced. The present invention eliminates the concern of firemen about improper operation of the transfer box and pump throttle control, thus allowing the firemen to concentrate on fire fighting.

Where the pump throttle control includes a cable which is moved to vary the engine speed, the cable is divided into two segments. The adjacent segment ends are connected to opposite sides of a rotatably supported member so that they extend tangent to arcuate paths of rotation defined by the outer ends of the member.

In one embodiment a pin is moved from a first position in which it prevents rotation of the member and movement of the cable in a direction that would increase the engine speed, to a second position in which it is clear of the member. In another embodiment the segments are slidably connected in slots in opposite sides of the member. The member is supported so that its point of rotation can be changed from a first position where the segment connected to the engine will not move to a second position where it will move. Alternate mechanical and electrical means are provided for detecting the mode of the transfer box and changing the position of the pin or the point of rotation of the member so that the cable segment connected to the engine cannot be moved in a direction that would increase the engine speed by operating the remote throttle control unless the engine is operatively connected to the pump.

A mechanical override mechanism is provided for moving the pin or the pivot point so that the engine speed can be increased if the electrical means should fail. Without this mechanism there would be a danger that the transfer box could be properly shifted into its pump drive mode, yet the pump speed could not be increased, inhibiting the dispensing of adequate amounts of water to fight a fire.

The novel features which are believed to be characteristic of the invention, both as to organization and method of operation, together with further objects and advantages thereof will be better understood from the following description considered in connection with the accompanying drawings in which preferred embodiments of the invention are illustrated by way of example. It is to be expressly understood, however, that the drawings are for the purpose of illustration and description only and are not intended as a definition of the limits of the invention.

BRIEF DESCRIPTION OF THE DRAWINGS

FIG. 1 is a functional block diagram of the safety interlock system of the present invention;

FIG. 2 is an elevational view of an embodiment in which the two segments of the remote throttle control cable are connected to opposite sides of the rotatably supported member showing the relative location of the pin which prevents rotation of the member in a direction that would increase the engine speed;

FIG. 3 shows a sectional view of the solenoid which moves the pin, an elevational view of a mechanical override mechanism, and a schematic diagram of the electrical means for detecting the mode of the transfer box and selectively energizing the solenoid;

FIG. 4 shows another embodiment in which the pin is moved by a mechanical linkage connected between it and the transfer box shifting shaft, the pin being shown in section and the linkage and transfer box being shown in elevation; and FIGS. 5 and 6 are elevational views of two further embodiments in which the two cable segments are slidably connected in slots in opposite sides of the member, each embodiment having different means for changing the point of rotation of the member.

DESCRIPTION OF THE PREFERRED EMBODIMENTS

The overall operation of the safety interlock system can be understood by way of reference to FIG. 1. The fire truck has a transfer box which is coupled through an automatic transmission to the fire truck engine. The transfer box is manually shiftable from a first mode in which it operatively connects the engine with the fire truck wheels, to a second mode in which it operatively connects the engine with the pump. The fire truck further has a first throttle control for varying the engine speed from the fire truck cab and a second throttle control which is operable from the pump control panel on the side of the truck. Both throttle controls include cables (shown in dashed lines) which are connected with the engine. The cable of the second throttle control is divided into two segments, a first segment A which is connected at one end to the engine, and a second segment B which is connected at one end to an advancement mechanism such as a lever mounted on the pump control panel. The other ends of segments A and B are connected to the safety interlock. The safety interlock detects the mode of the transfer box and prevents the engine speed from being increased with the advancement mechanism of the second throttle control when the transfer box is in the first mode. A warning light on the pump control panel is illuminated when the transfer box is in its first mode to alert the fireman that the transfer box must be shifted before the second throttle control can be operated. An override which includes a cable connected at one end to the safety interlock and at the other end to a knob on the pump control panel allows the fireman to override the safety interlock in the event that it has electrical components which can fail.

Referring to FIG. 2, one embodiment of the present invention includes a semi-circular member 2 which is rotatably supported on axle 4 which in turn is mounted to a support 6. Portions 8 and 10 of member 2 extend generally oppositely outward from the axis of rotation of the member. The outermost ends of portions 8 and 10 define arcuate paths 12 and 14 shown in dashed lines when member 2 is rotated.

The cable of the second throttle control is divided into two segments. A first segment A is connected at one end to the engine through a conduit assembly 16 and at the other end to a fastener 18 which is connected to the outer region of portion 8 of member 2. A second segment B of the cable of the second throttle control is connected at one end to the advancement mechanism on the pump control panel through a conduit assembly 20 and at the other end to a fastener 22 which is connected to the outer region of portion 10 of member 2. Cable segments A and B extend substantially tangent to arcuate paths 12 and 14 respectively.

A pin 24 is supported adjacent member 2 with its axis generally parallel to the axis of rotation of the member. The pin is axially movable from a first position in which it prevents any substantial counter-clockwise rotation of member 2 and thus any movement of cable segment A in a direction away from the engine, to a second position in which it is clear of member 2. When pin 24 is in its second position, the advancement mechanism on the pump control panel can be manually operated to move cable segment B in a direction toward the control panel, which will rotate member 2 in a counter-clockwise direction and move cable segment A in a direction away from the engine to increase its speed.

Referring to FIG. 3, pin 24 is supported in a bearing 26. Pin 24 has a flange 28 and a spring 30 biases the pin toward its first position in which it prevents any substantial counter-clockwise rotation of member 2. The end of pin 24 remote from member 2 has coupled to it a solenoid, generally designated 32. Solenoid 32 comprises a magnetic plunger element 34 which surrounds pin 24 and a coil 36 which receives the plunger. Coil 36 is electrically connected to an electric power source 38 through an electrical switch 40 mounted adjacent the shifting shaft 42 of transfer box 44.

Shifting shaft 42 moves axially from position C when the transfer box is in its first mode (wheel drive mode) to position D when the transfer box is shifted to its second mode (pump drive mode). When shifting shaft 42 moves to position D, it closes switch 40 which energizes solenoid 32 and causes plunger element 34 to be drawn into coil 36. This moves pin 24 into its second position in which it is clear of member 2. When shifting shaft 42 moves back to position C, switch 40 opens, de-energizing solenoid 32, and spring 30 pushes pin 24 back into its first position in which it prevents any substantial counter-clockwise rotation of member 2.

Also shown in FIG. 3 is a mechanical override mechanism for moving pin 24 if any of the electrical components should fail. One end of a cable 46 is connected to a fastener 48 which is connected to the remote end of pin 24. The other end of cable 46 is connected through a conduit assembly 50 to a knob 52 which is mounted on the pump control panel 53. Knob 52 is pulled to move pin 24 into its second position. Knob 52 is well marked and can be concealed by a removable cover (not shown) to prevent it from being inadvertently used under normal conditions.

FIG. 4 shows an embodiment in which pin 24 is moved by a mechanical linkage connected between it and shifting shaft 42. A cable 54 is connected to the remote end of pin 24 by a fastener 56. Cable 54 extends through a conduit assembly 58 and its other end is connected to shifting shaft 42. Pin 24 is moved from its first position to its second position, and vice versa as shifting shaft 42 moves from position C to position D and vice versa.

FIGS. 5 and 6 show further embodiments in which member 2' is rotatably supported on a first axle 60 which is eccentrically mounted on a second rotatably supported axle 62. Segments A and B of the second throttle control are connected at their one ends to the engine and to the advancement mechanism on the pump control panel, respectively, through conduit assemblies 16' and 20'. At their other ends, segments A and B are connected to fasteners 18' and 22', respectively, which are slidably mounted in slots 64 and 66 in the outer regions of portions 8' and 10' of member 2'. Second axle 62 has an arm 68 which extends perpendicular to its axis.

Referring to FIG. 5, second axle 62 is rotated by a rod 70 which is coupled at one end to arm 68 and at its other end to a solenoid 72. The solenoid is electrically connected to a switch adjacent the transfer box shifting shaft (not shown) in the same manner as solenoid 32 in FIG. 3. Not shown is a spring mechanism for rotating second axle 62 in a counter-clockwise direction when solenoid 72 is de-energized. A mechanical override mechanism, generally designated 73 is connected to the end of rod 70 remote from arm 68 so that second axle 62 can be rotated in a clockwise direction if any of the electrical components fail. This override mechanism operates in a manner similar to that shown in FIG. 3.

Referring to FIG. 6, a cable 74 is connected at one end through a conduit assembly 76 to a mechanical linkage (not shown) associated with the transfer box. The other end of cable 74 is connected to a fastener 78 which is connected to the remote end of rod 70.

Referring to FIGS. 5 and 6, rod 70 can be moved to change the position of arm 68 from that shown in FIG. 6 to that shown in FIG. 5, and back again. This rotates second axle 62 and changes the position of first axle 60 and thus the point of rotation of member 2'.

In FIG. 6, the transfer box (not shown) is in its first mode, and second axle 62 is in its first position. In this position, the advancement mechanism can be operated to pull segment B toward it (if the fireman tries to increase the engine speed) and fastener 22' will slide in slot 66. No counter-clockwise rotation of member 2' will occur and segment A will not be pulled away from the engine to increase its speed. Even if fastener 22' moves to the lower end of slot 66 and member 2' rotates slightly, fastener 18' will slide in slot 64 and no movement of segment A will occur.

In FIG. 5, the transfer box (not shown) is in its second mode, and second axle 62 has been moved to its second position. The point of rotation of member 2' has changed so that fasteners 22' and 18' rest at the lower ends of slots 66 and 64 respectively. When the advancement mechanism on the pump control panel is operated to pull segment B toward it, member 2' is rotated in a counter-clockwise direction and segment A is pulled away from the engine, thereby increasing its speed.

While preferred embodiments of the present invention have been illustrated in detail, it is apparent that modifications and adaptations of those embodiments will occur to those skilled in the art. However, it is to be expressly understood that such modifications and adaptations are within the spirit and scope of the present invention as set forth in the following claims.

What is claimed as new is:

1. In a vehicle of the type in which the engine can either propel the vehicle or drive a pump carried by the vehicle for dispensing fluids, the vehicle having a first throttle control which is manually operable from its cab for varying the engine speed when the vehicle is being driven, and a second throttle control remote from the cab for varying the engine speed when the engine is driving the pump, the vehicle further having a transfer box which is coupled through an automatic transmission to the engine, the transfer box being manually shiftable from a first mode in which it operatively connects the engine with the vehicle wheels, to a second mode in which it operatively connects the engine with the pump, the improvement comprising:

means for detecting the mode of the transfer box; and
means responsive to the detection means for locking the second throttle control in its closed position when the transfer box is in its first mode to prevent the engine speed from being advanced from a position remote from the cab while the engine is engaged with the drive wheels of the vehicle.

2. The invention of claim 1 wherein the second throttle control includes a cable and means for advancing the cable remote from the cab; the responsive means includes a rotatably supported member which rotates responsively to movement of the cable, and a pin adapted to be moved into engagement with the rotatably supported member to prevent substantial rotation thereof; and the detecting means includes means associated with the transfer box for moving the pin into engagement with the rotatably supported member when the transfer box is in its first mode.

3. The invention of claim 2 wherein the detecting means includes a mechanical linkage between the pin and the transfer box.

4. The invention of claim 2 wherein the detecting means includes a solenoid coupled to the pin for moving the pin into and out of engagement with the rotatably supported member, and an electrical switch coupled to the transfer box to activate the solenoid responsively to the mode of the transfer box.

5. The invention of claim 4 and further comprising a mechanical linkage coupled at its one end to the pin and manually operable at its other end for moving the pin if the solenoid or the electrical switch should fail.

6. The invention of claim 1 wherein the second throttle control includes a cable and means for advancing the cable remote from the cab, the cable being divided into two segments, a first segment which is connected at one end to the engine, and a second segment which is connected at one end to the advancing means; the responsive means includes a rotatably supported member, means for slidably connecting the other ends of the segments to generally opposite regions of the member, and means associated with the transfer box for changing the point of rotation of the member to a first position when the transfer box is in its first mode so that the segment connecting means can move freely relative to the member when the advancing means is operated, to a second position when the transfer box is in its second mode so that advancement of the second segment by operation of the advancing means will rotate the member and advance the first segment so that the engine speed is increased.

7. The invention of claim 6 wherein the means for changing the point of rotation of the member includes a mechanical linkage between the member and the transfer box.

8. The invention of claim 6 wherein the means for changing the point of rotation of the member includes a solenoid coupled to the member, and an electrical switch coupled to the transfer box to activate the solenoid responsively to the mode of the transfer box.

9. The invention of claim 8 and further comprising a mechanical linkage coupled at its one end to the member and manually operable at its other for changing the point of rotation of the member if the solenoid or the switch should fail.

10. In a vehicle of the type in which the engine can either propel the vehicle or drive a pump carried by the vehicle for dispensing fluids, the vehicle having a first throttle control which is manually operable from its cab for varying the engine speed when the vehicle is being driven, and a second throttle control for varying the engine speed when the engine is driving the pump, the second throttle control including a cable and means for advancing the cable remote from the cab, the vehicle further having a transfer box which is coupled through an automatic transmission to the engine, the transfer box being manually shiftable from a first mode in which it operatively connects the engine with the vehicle wheels, to a second mode in which it operatively connects the engine with the pump, the improvement comprising:
- a rotatably supported member, means for connecting a first segment of the cable to a first side of the member and means for connecting a second segment of the cable to a second generally opposite side of the member;
- a pin adapted to be moved into engagement with the rotatably supported member to prevent substantial rotation thereof; and
- means associated with the transfer box for moving the pin into engagement with the rotatably supported member when the transfer box is in its first mode, and out of engagement with the rotatably supported member when the transfer box is in its second mode.

11. The invention of claim 10 wherein the means associated with the transfer box includes a mechanical linkage between the pin and the transfer box.

12. The invention of claim 10 wherein the means associated with the transfer box includes a solenoid coupled to the pin for moving the pin into and out of engagement with the rotatably supported member, and an electrical switch coupled to the transfer box to activate the solenoid responsively to the mode of the transfer box.

13. The invention of claim 12 and further comprising a mechanical linkage coupled at its one end to the pin and manually operable at its other end for moving the pin if the solenoid or the electrical switch should fail.

14. In a vehicle of the type in which the engine can either propel the vehicle or drive a pump carried by the vehicle for dispensing fluids, the vehicle having a first throttle control which is manually operable from its cab for varying the engine speed when the vehicle is being driven, and a second throttle control for varying the engine speed when the engine is driving the pump, the second throttle control including a cable and means for advancing the cable remote from the cab, the vehicle further having a transfer box which is coupled through an automatic transmission to the engine, the transfer box being manually shiftable from a first mode in which it operatively connects the engine with the vehicle wheels, to a second mode in which it operatively connects the engine with the pump, the improvement comprising:
- a rotatably supported member, means for slidably connecting a first segment of the cable to a first side of the member and means for slidably connecting a second segment of the cable to a second generally opposite side of the member;
- means associated with the transfer box for changing the point of rotation of the member to a first position when the transfer box is in its first mode so that the segment connecting means can move freely relative to the member when the advancing means is operated, and to a second position when the transfer box is in its second mode so that operation of the advancing means will cause the member to rotate so that the engine speed is increased.

15. The invention of claim 14 wherein the means for changing the point of rotation of the member includes a mechanical linkage between the member and the transfer box.

16. The invention of claim 14 wherein the means for changing the point of rotation of the member includes a solenoid coupled to the member, and an electrical switch coupled to the transfer box to activate the solenoid responsively to the mode of the transfer box.

17. The invention of claim 16 and further comprising a mechanical linkage coupled at its one end to the member and manually operable at its other end for changing the point of rotation of the member if the solenoid or switch should fail.

* * * * *